G. M. TREMMEL & E. CHRISTENSEN.
SPRING WHEEL.
APPLICATION FILED FEB. 7, 1910.
987,191.
Patented Mar. 21, 1911.
2 SHEETS—SHEET 1.
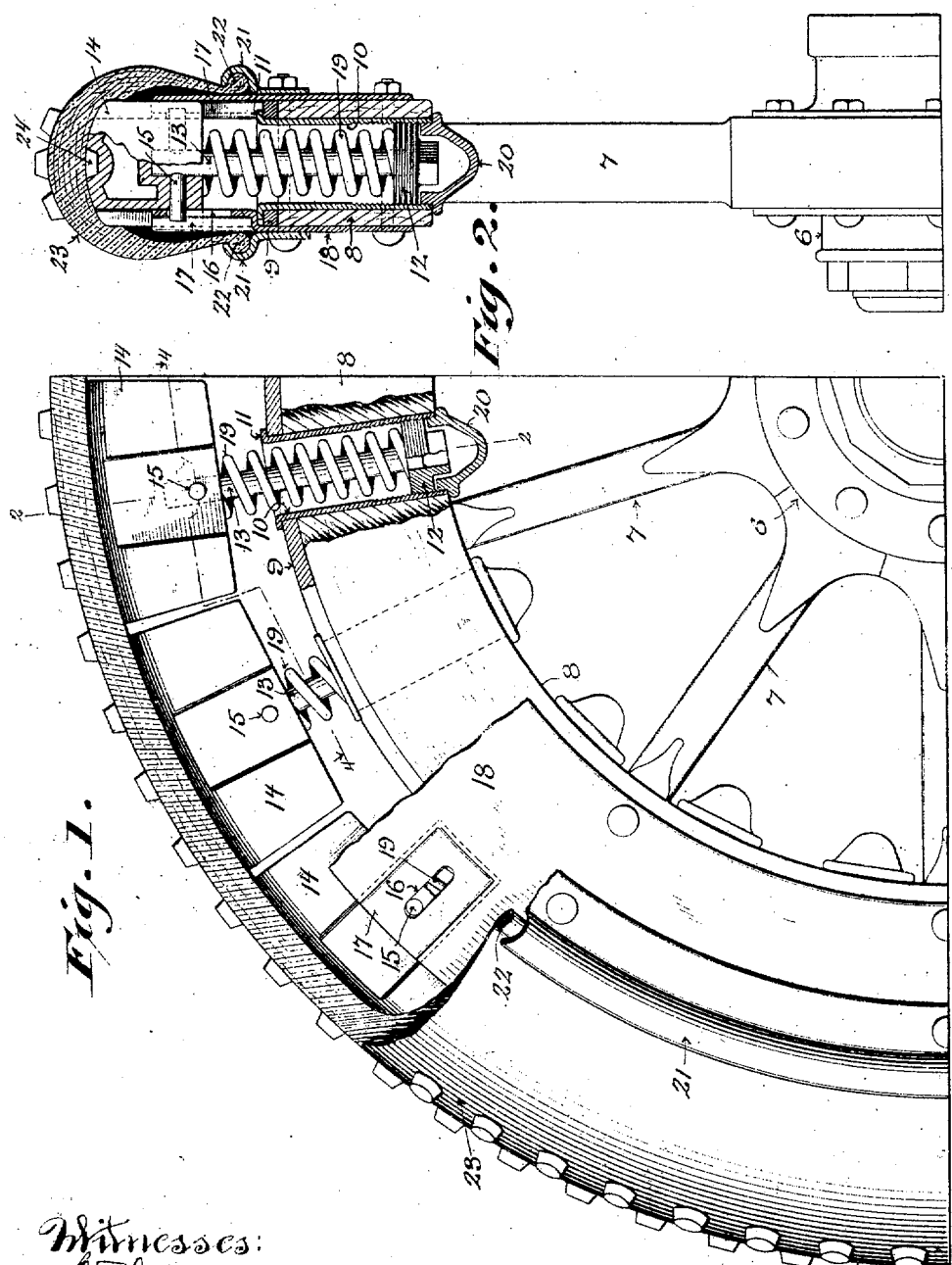
Witnesses:
Inventors
George M. Tremmel.
Emil Christensen.
By Oliphant & Young
Attorneys G. M. TREMMEL & E. CHRISTENSEN.
SPRING WHEEL.
APPLICATION FILED FEB. 7, 1910.
987,191.
Patented Mar. 21, 1911.
2 SHEETS—SHEET 2.
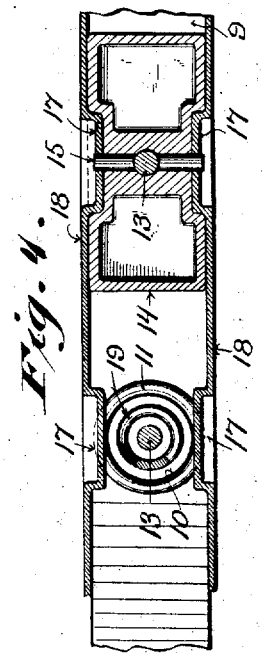
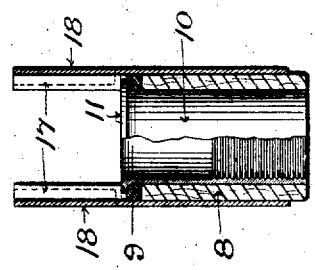
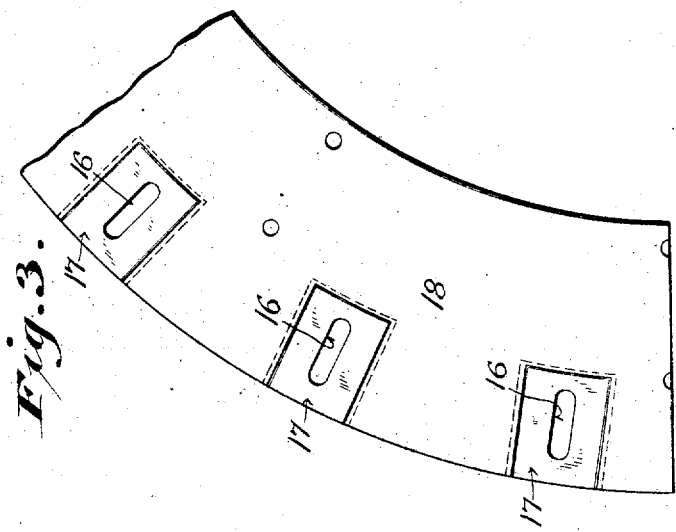
Witnesses:
Inventors
George M. Tremmel.
Emil Christensen.
By Oliphant & Young
Attorneys

UNITED STATES PATENT OFFICE.

GEORGE M. TREMMEL AND EMIL CHRISTENSEN, OF TWO RIVERS, WISCONSIN.

SPRING-WHEEL.

987,191.  Specification of Letters Patent.  Patented Mar. 21, 1911.

Application filed February 7, 1910. Serial No. 542,558.

*To all whom it may concern:*

Be it known that we, GEORGE M. TREMMEL and EMIL CHRISTENSEN, both citizens of the United States, and residents of Two Rivers, in the county of Manitowoc and State of Wisconsin, have invented certain new and useful Improvements in Spring-Wheels; and we do hereby declare that the following is a full, clear, and exact description thereof.

Our invention consists in what is herein particularly set forth with reference to the accompanying drawings and pointed out in claims of this specification its object being to provide simple, economical, strong, durable and efficient spring-wheels for various vehicles.

Figure 1 of the drawings represents a side elevation of a fragment of one of our improved vehicle wheels having parts thereof broken away and in section; Fig. 2, a transverse sectional view of the same on the plane indicated by line 2—2 in Fig. 1; Fig. 3, a side elevation of one of a pair of circular plates employed as parts of the wheel; Fig. 4, a horizontal sectional view indicated by line 4—4 in Fig. 1, and Fig. 5, a partly transverse sectional view of a detail of said wheel.

Referring by numeral to the drawings, 6 indicates the hub, 7 spokes and 8 the rim of a for the most part wooden wheel, as ordinarily constructed, and a metal stay-band 9 is shown on the rim, as virtually constituting a part of same. The band and rim are radially bored at regular intervals circumferentially of the same and fitted in each bore is a thimble 10 having an outer end flange 11 opposing said band. The inner end of each thimble is interiorly screw-threaded for the engagement of the correspondingly threaded nut 12 loose on a stem 13 that extends outward beyond said thimble. The outer end of each stem engages a socket provided in a solid central portion of an otherwise preferably hollow sector-block 14, and a pin 15 extends through the block and stem, the projecting ends of the pin being engaged with radial slots 16 in preferably angularly indented portions 17 of circular plates 18 that are bolted to the sides of the rim 8 to project beyond the same.

The sector-blocks 14 are shown as being provided with central side recesses engaging the slotted indentations 17 of the plates 18 that serve as guides for said blocks, and surrounding each of the stems 13, between the corresponding sector-block and the nut 12 engaging said stem, is a spiral-spring 19, the tension of the spring being regulated by the adjustment of said nut in the adjacent thimble 10, a screw-cap 20 being employed to close the inner end of said thimble.

Bolted to the plates 18 are clencher-rings 21 engaged by clencher-beads 22 of a flexible tread 23 that is stretched over the sector-blocks 14 and preferably metal studded upon its periphery. To prevent creep of the tread, it is provided with inner studs 24 that engage radial recesses provided in said sector-blocks, one of these studs in the arrangement specified being shown in Fig. 2.

The sector-blocks 14, concentric with the rim 8, are normally spaced apart far enough to provide for their radial yield under pressure against the resistance of the springs 19, and said blocks are held in alinement by the plates 18. A flexible tread arranged as herein shown and described is preferable, but may be omitted, and in matters of detail the construction of the wheel may be otherwise indefinitely varied without departure from the generic features of our invention.

We claim:

1. In a vehicle-wheel, the combination of a rim, thimbles in the rim radially thereof at intervals circumferentially of the same, a support in each thimble, a stem slidable in the support and extending outward beyond the rim, a sector-block engaging the outer end of the stem concentric with said rim, a pin extending transversely through the block and stem, circular plates in connection with the sides of the aforesaid rim and provided with radial slots with which the ends of the pin are engaged, and a spring under tension between said support and block.

2. In a vehicle-wheel, the combination of a rim, a series of radially yielding spring-controlled sector-blocks concentric with the rim outward therefrom, circular plates in connection with said rim and having indentations engaging side recesses provided in the blocks, and projections laterally of said blocks engaging slots provided in said indentations of the plates.

3. In a vehicle-wheel, the combination of a rim, thimbles in the rim radially thereof at intervals circumferentially of the same, caps in detachable connection with the inner ends of the thimbles, a support in each thimble independent of the cap of the same, a stem slidable in the support and extending outward beyond the rim, a sector-block engaging the outer end of each stem concentric with said rim, a pin extending transversely through the block and stem, circular plates in connection with the sides of the aforesaid rim and provided with radial slots with which the ends of the pin are engaged, and a spring under tension between said support and block, and a yielding tread inclosing said blocks.

In testimony that we claim the foregoing we have hereunto set our hands at Two Rivers in the county of Manitowoc and State of Wisconsin in the presence of two witnesses.

GEO. M. TREMMEL.
EMIL CHRISTENSEN.

Witnesses:
E. J. SOIK,
CHAS. F. KINT.

Copies of this patent may be obtained for five cents each, by addressing the "Commissioner of Patents, Washington, D. C."